Patented Mar. 10, 1925.

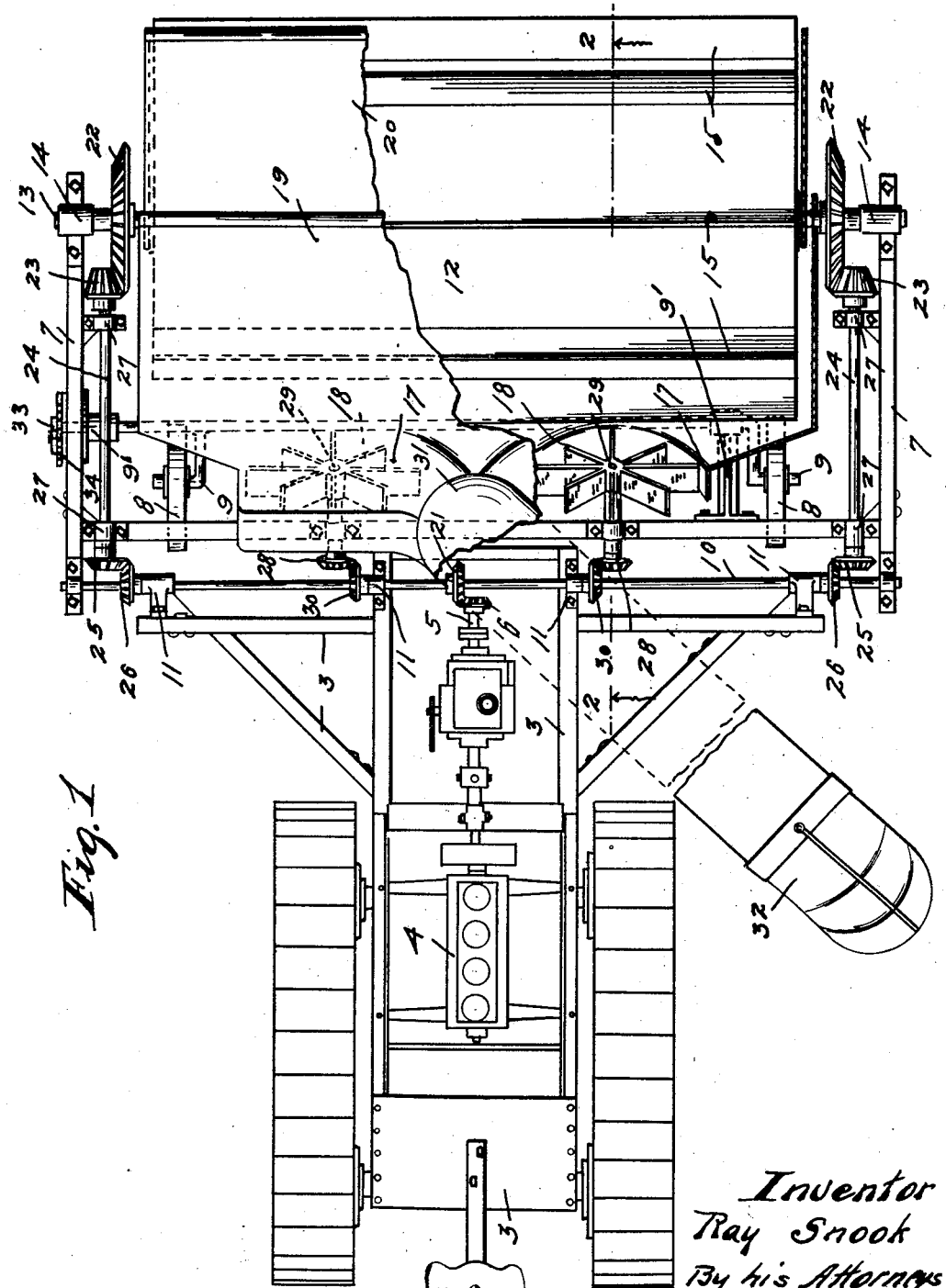

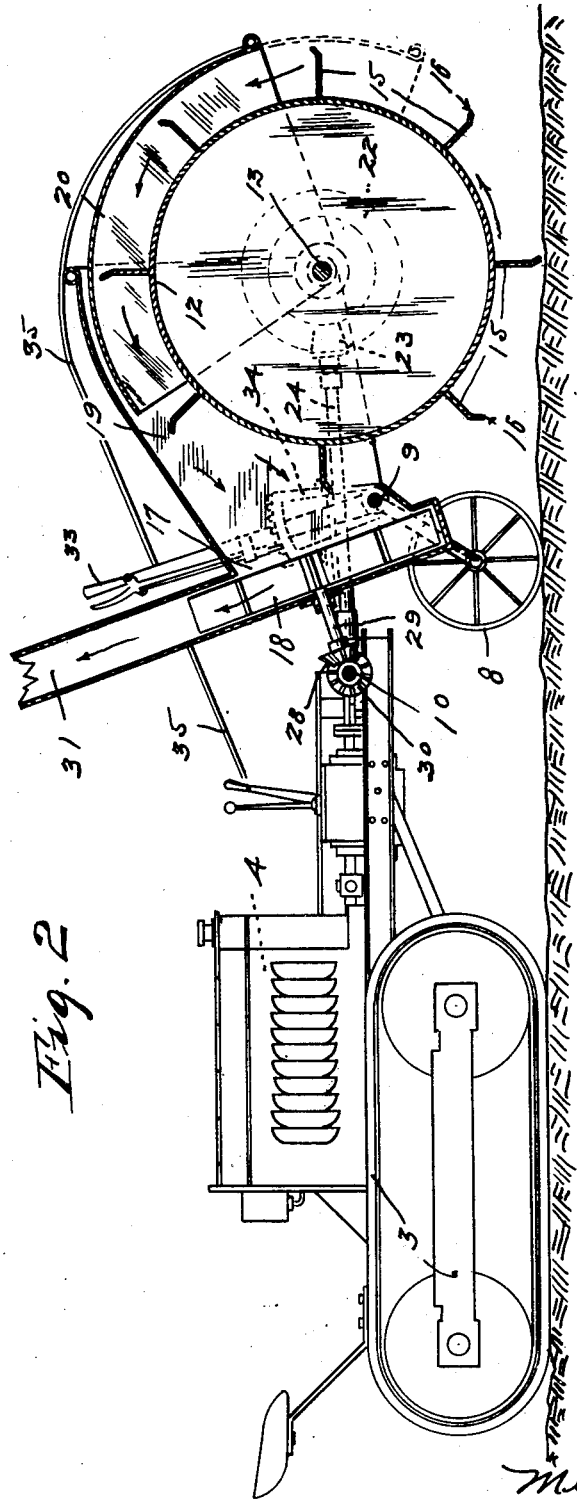

UNITED STATES PATENT OFFICE.

RAY SNOOK, OF WINDOM, MINNESOTA.

HIGHWAY ROTARY SNOWPLOW.

Application filed August 24, 1922. Serial No. 583,997.

*To all whom it may concern:*

Be it known that I, RAY SNOOK, a citizen of the United States, residing at Windom, in the county of Cottonwood and State of Minnesota, have invented certain new and useful Improvements in Highway Rotary Snowplows; and I do hereby declare the following to be a full, clear, and exact description of the invention, such as will enable others skilled in the art to which it appertains to make and use the same.

My invention has for its object to provide an efficient rotary snow plow, especially adapted for keeping highways open to facilitate the travel of automobiles, motor-propelled trucks and bus lines.

To the above end, generally stated, the invention consists of the novel devices and combination of devices hereinafter described and defined in the claims.

In the accompanying drawings, which illustrate the invention, like characters indicate like parts throughout the several views.

Referring to the drawings:—

Fig. 1 is a fragmentary plan view of the improved rotary snowplow attached to a tractor of the caterpillar type; and Fig. 2 is a view partly in side elevation and partly in vertical section taken in the vicinity of the line 2—2 of Fig. 1.

The invention, as illustrated, is attached to and arranged to be pushed in front of a tractor of the caterpillar type and driven from the engine thereof, but it is, of course, understood that the rotary snow plow may be operated by a motor mounted directly thereon and said snowplow pushed by draft animals of a motor-propelled vehicle. The tractor is indicated as an entirety by the numerals 3, with the exception of its motor 4, on the shaft 5 of which is secured a bevel gear 6.

The improved rotary snowplow has a truck frame 7 mounted at its intermediate portion on a pair of wheels 8 journaled on a crank axle 9, journaled in bearings 9' on said frame. This frame 7 is pivotally connected to the front end of the frame of the tractor 3, with freedom for vertical oscillatory movement, by a shaft 10 journaled in bearings 11 on said tractor frame.

A carrying drum 12 is secured to a horizontal transverse shaft 13 journaled in bearings 14 at the front of the frame 7 and is provided with a multiplicity of circumferentially spaced peripheral combined cutting and pick-up blades 15, the outer longitudinal edges of which are bent upward to afford cutting edges 16. These blades 15 are arranged to cut and pick up the snow and carry the same on the drum 12, upward, rearward and into two vertically disposed and rearwardly inclined fan casings 17, at the rear of the drum 12, and in each of which is mounted a blower fan 18. The drum 12 is rotated, as will presently appear, in the direction of the arrow marked in the vicinity thereof on Fig. 2 to cause its blade 15 to act as described and deposit the snow into the fan casing 17 and between the blades of the blower fans 18.

To hold the snow on the drum 12 and blades 16, and direct the same into the fan casings 17, there is provided a housing comprising a fixed rear section 19 and an adjustable front section 20. The fixed housing section 19 is secured to the frame 7 and fan casing 17 and extends forward to a point over the shaft 13. The movable housing section 20 is in the form of a segment having depending sides that are pivoted on the shaft 13. Said movable housing section 20 is arranged to move into and out of the fixed housing section 19 whereby said movable housing section 20 may be adjusted so that its front edge may be set different heights above the roadbed in front of the drum 12, as indicated by broken lines in Fig. 2.

The drum 12 is driven in the direction of the arrow, previously referred to, from the shaft 10 which, in turn, is driven from the motor shaft 5 by a gear 21 keyed to said shaft 10 and meshing with the gear 6. To thus drive the drum 12 from the shaft 13, there is keyed to the shaft 13, at each end of the drum 12, a large bevel gear 22 which meshes with a pinion 23 on a countershaft 24 having a gear 25 which meshes with a gear 26 keyed to the shaft 10. The countershafts 24 are journaled in bearings 27 on the frame 7. The blower fans 18 are also driven from the shaft 10 by gears 28 on their shafts 29 and which gears 28 mesh with gears 30 keyed to the shaft 10. Both blower fans 18 are arranged to throw the snow carried thereby into a common rotatable stack 31 attached to the fan casings 17 and having, on its upper end, an adjustable hood 32.

From the above description, it is evident that by adjusting the crank axle 9, the drum 12 may be raised and lowered to cause the blades 15 to pick up the snow different distances above the roadbed. To adjust the crank axle 9 and hold the same in different set positions, there is secured to one end thereof, a latch lever 33 arranged for cooperation with a latch segment 34 secured to the frame 7.

The movable housing section 20 may be raised or lowered, at the will of the operator, and for light snows, said housing section will, of course, be lowered so as to hold the snow on the blades 15 as the same is picked up and carried upward thereby. For deep snow or drifts, the movable housing section 20 will, of course, have to be raised so as to pass over the top thereof. As shown, the movable housing section 20 can be raised or lowered by means of a connection 35 which extends to within easy reach of the operator of the tractor.

What I claim is:—

1. A snowplow comprising a drum mounted to rotate on a horizontal axis and having a plurality of circumferentially spaced peripheral blades, a blower including a blade-equipped fan mounted to rotate on an inclined horizontal axis, said drum being mounted to rotate in the direction of the travel of the snowplow and said fan being mounted to rotate transversely thereof, said fan being located closely back of the drum and rearwardly inclined in respect thereto, and means for driving the drum in a direction to cause its blades to pick up snow, carry the same over the drum and throw the same downward directly into the fan.

2. The structure defined in claim 1 in further combination with adjustable means for changing the inclination of the fan.

3. The structure defined in claim 1 in further combination with adjustable means for simultaneously changing the inclination of the fan and raising or lowering the drum.

In testimony whereof I affix my signature.

RAY SNOOK.